United States Patent [19]

Hogge

[11] Patent Number: 5,280,425
[45] Date of Patent: Jan. 18, 1994

[54] APPARATUS AND METHOD FOR PRODUCTION PLANNING

[75] Inventor: John C. Hogge, Richardson, Tex.

[73] Assignee: Texas Instruments Incorporated, Dallas, Tex.

[21] Appl. No.: 558,970

[22] Filed: Jul. 26, 1990

[51] Int. Cl.⁵ .............................................. G06F 15/20
[52] U.S. Cl. .................................. 364/402; 364/406; 364/408; 364/468
[58] Field of Search ...................... 364/401–

[56] References Cited

U.S. PATENT DOCUMENTS

| | | | |
|---|---|---|---|
| 4,887,206 | 12/1989 | Natarajan | 364/468 |
| 4,887,207 | 12/1989 | Natarajan | 364/468 |
| 4,896,269 | 1/1990 | Tong | 364/468 |
| 5,053,970 | 10/1991 | Kurihara et al. | 364/401 |
| 5,093,794 | 3/1992 | Howie et al. | 364/194 |

OTHER PUBLICATIONS

Driscoll and Emmons, "Scheduling Production on One Machine with Changeover Costs", *AIIE Transactions*, vol. 9, No. 4, Dec. 1977, p. 388.

Glassey "Minimum Change-Over Scheduling of Several Products on One Machine", *Options Research*, col. 16, No. 2, Mar.-Apr. 1968.

Lasdon and Terjung "An Efficient Algorithm for Multi-Item Scheduling", *Options Research*, vol. 19, p. 946.

Leachman, Preliminary Design and Development of a Corporate-Level Production Planning System for the Semiconductor Industry, Operations Research Center, U-California, Berkeley, May 18, 1987.

Saad, "An Overview of Production Planning Models: Structural Classification and Empirical Assessment", *Int. J. Prod. Res.*, 1982, vol. 20, No. 1, p. 105.

*Primary Examiner*—Roy N. Envall, Jr.
*Assistant Examiner*—Frantzy Poinvil
*Attorney, Agent, or Firm*—Robert L. Troike; Leo N. Heiting; Richard L. Donaldson

[57] ABSTRACT

Apparatus and method for production planning in a manufacturing facility is provided. The apparatus and method generates a plurality of theoretical plans and a constraint-based model for receiving one of the theoretical production plans, and applying at least one constraint thereto. Further, a cost function is computed for the theoretical production plans. Then, the apparatus and method searches for a feasible production plan among the plurality of theoretical plans, where the feasible plan is the plan which does not violate the applied constraint and has the least computed cost function.

42 Claims, 2 Drawing Sheets

APPARATUS AND METHOD FOR PRODUCTION PLANNING

TECHNICAL FIELD OF THE INVENTION

This invention relates in general to the field of scheduling systems. More particularly, the present invention relates to apparatus and a method for production planning.

BACKGROUND OF THE INVENTION

Production planning is the process of choosing work to be started in a manufacturing facility during some future time period so that performance is maximized. Work is usually selected from a variety of product types which may require different resources and serve different customers. Therefore, the selection must optimize customer-independent performance measures such as cycle time and customer-dependent performance measures such as on-time delivery.

The reasons for requiring advanced production planning may be unique to each manufacturing facility. For example, one facility may require advanced planning so that materials may be ordered and delivered in time for manufacture. Another facility may require advanced planning in order to make delivery commitments or predict delays in product delivery.

In order to configure a production plan which yields the best performance, the capacity, or the amount of work the facility can handle, must be modeled in some fashion, since starting work above the capacity of the facility compromises performance and brings forth no benefits. Conventional factory capacity models employ simple steady-state linear relations that include: (1) the average amount of available work time for each machine in the factory and (2) the amount of work each product requires of each machine. From the above linear relations, a given start plan is within capacity if, for each machine, the total required amount of work is: (1) less than the machine's available time, and (2) multiplied by a predetermined fraction goal utilization of the start rate.

There are several problems associated with a linear production planning program. Because of the large problem size, variables in linear programs must be expressed in non-integer quantities in order to yield good solutions. As a result, fractional start quantities may be generated which must be converted into discrete start quantities. Such forced conversion sacrifices the goodness of the solution.

Additionally, non-linear relationships cannot be modeled in a linear program. Examples of such relationships are the expected yield for a product's start quantity, and the cost of surplus and delinquency. Such non-linear relationships have been traditionally coerced into linear expressions with loss of precision.

The large problem size presents another obstacle for linear production planning programs. Even if a planning problem can be expressed in a linear program, the problem size may prohibit efficient solution via conventional linear programming techniques. This problem has not been overcome in the industry without substantial loss of optimality in the solution.

Therefore, a need has arisen for apparatus and method to formulate a production plan for a manufacturing facility that accommodates integer variables, allows non-linear expressions and provides a near optimal production plan despite the large problem size.

SUMMARY OF THE INVENTION

In accordance with the present invention, apparatus and method for production planning are provided which substantially eliminate or reduce disadvantages and problems associated with prior production planners.

In one aspect of the present invention, apparatus for production planning in a manufacturing facility is provided. The apparatus comprises means for generating a plurality of theoretical plans and a constraint-based model for evaluating one of the theoretical production plans, and applying at least one constraint thereto. Further, a cost function is computed for each of the theoretical production plans. Means is then provided for searching for a feasible production plan among the plurality of theoretical plans that does not violate any of the applied constraints and has the least computed cost function value.

In another aspect of the present invention, apparatus for production planning in a manufacturing facility is provided. The apparatus comprises means for computing (e.g. computer) the capacity of the factory in order to produce the determined quantities and types of product, means for computing the maximum factory capacity, and means for comparing the computed production capacity with the maximum factory capacity. Further included are means for computing the cost of producing the determined quantities and types of product in response to the computed production capacity being less than or equal to the maximum factory capacity and means for selecting a production plan that has the least computed cost function value.

In yet another aspect of the present invention, a method for generating a production plan for a manufacturing facility is provided, which comprises the steps of initializing the production plan, and generating a plurality of proposals to modify the production plan. At least one constraint is formulated and applied to the production plan as modified by each of the plurality of proposals. Any proposal which causes the production plan to contradict the constraints is then discarded, after which the cost of implementing the production plan as modified by each of the remaining proposals is computed. A proposal which causes the production plan to have the least computed cost is selected and the above steps are repeated until no proposals remain after the discarding step. The current production plan is then offered as the solution production plan.

An important technical advantage of the present invention provides a formulation of production planning as a cost minimization problem using constraint-based models.

Another important technical advantage of the present invention provides a production planner which employs a heuristic search algorithm which iteratively manipulates a starting plan to reduce the plan cost until no further manipulation improves the plan.

Yet another important technical advantage of the present invention provides a more accurate production planner which accommodates real variables and linear equalities as well as integer variables and non-linear equalities.

BRIEF DESCRIPTION OF THE DRAWINGS

For a better understanding of the present invention, reference may made to the accompanying drawings, in which.

DETAILED DESCRIPTION OF THE INVENTION

Figure 1:
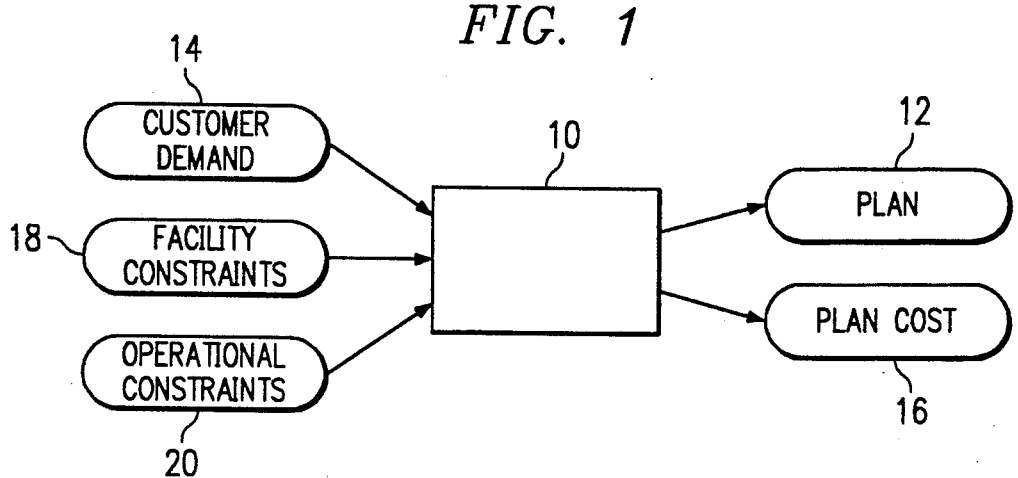
FIG. 1 is a simplified block diagram showing the inputs and outputs of the present invention.

With reference to the drawings, FIG. 1 illustrates some of the input and output parameters of a preferred embodiment of the apparatus and method for production planning for a manufacturing facility, indicated generally at 10 and constructed according to the teaching of the present invention. In order to formulate a production plan 12, production planner 10 takes into consideration inputs such as customer demand 14. Customer demand 14 may specify the quantity and type of products ordered by the customer, and the delivery date of the order. Customer demands 14 may also be prioritized in the order of importance. The output or end product of the manufacturing facility, when produced in accordance with production plan 12, should preferably meet customer demand 14 and yet not result in an over abundance in inventory. Similarly, there is also penalty when customer demand 14 is not met by the production plan 12. Therefore, associated with each production plan 12 is a plan cost 16, which represents the cost of implementing the plan.

Another set of inputs 18 describes the constraints placed on production planner 10 from facility related parameters, such as machine capacity, down time, etc. Therefore, the production volume is checked by facility constraints 18. Additional constraints 20 arising from the operation of the facility, such as yield, surplus and work-in-process, also regulate the production quantity and type of product that should be started.

Figure 2:
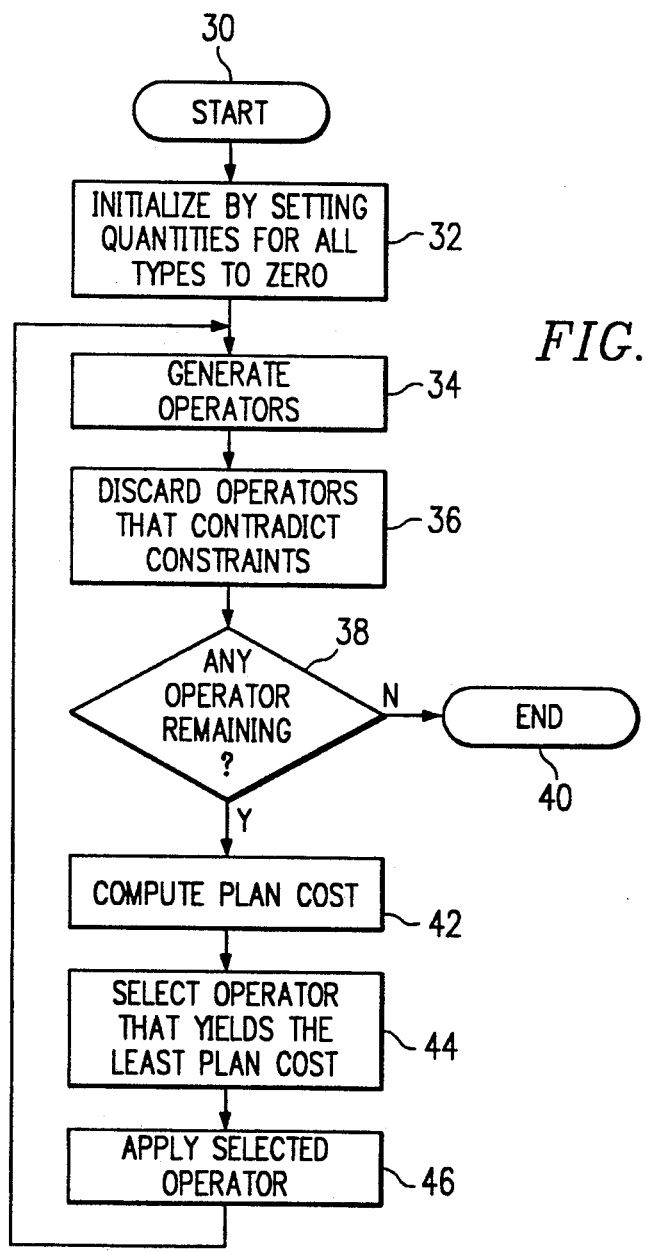
FIG. 2 is a flowchart of a heuristic search algorithm in the preferred embodiment of the present invention.

Referring to FIG. 2, a flowchart 30 of a heuristic search algorithm of the preferred embodiment of the present invention 10 (e.g. for a general purpose computer) is shown. The present invention employs the heuristic search algorithm to search for a suitable plan which specifies the product type and quantity to be started at the beginning of the next planning period without incurring high cost or violating any facility or operational constraints 18 and 20. The search algorithm starts by setting the quantities for all product types to zero. For a semiconductor wafer fabrication facility, this equates to setting the number of lots to be started to zero for all device types. This results in the worst and highest cost plan, since by producing nothing, none of the customer demands will be met.

From the initial zero plan, a set of operators which proposes changes to the plan is generated, as shown in block 34. The operators may propose to modify the plan in two ways. They may increase the number of lots to be started by one for a particular device type, or they may set the number of lots to a determinable number, so that critical customer orders for each device are covered. All operators reachable from the current plan in the above-identified ways are generated and examined to determine their feasibility. Those operators which generate plans that contradict facility or operational constraints are eliminated from the search, as shown in block 36.

If there are remaining operators, as determined in decision block 38, then a plan cost is computed for each remaining proposed plan. Of the remaining operators, the one which yields the most decrease in computed plan cost per addition to work is selected, as shown in block 44. The change in work may be defined as the change in the amount of utilization of the current top bottleneck machine in the current plan and may be computed by machine usage information 63. The selected operator is then applied to the current plan, as shown in block 46, to yield a new current plan. Execution then returns to block 34 where another set of operators are generated from the new current plan. The loop, including blocks 34 to 46, is repeated until, at block 38, no operator remains which does not contradict any constraints. The plan from which the last set of operators is generated is the solution production plan that will yield low plan cost, adds the least amount of work, and yet does not contradict any constraints.

One may recognize the above-described search algorithm as a beam search of width one, where each feasible plan constitutes a parent node in the search tree, and the operators are the children nodes of each parent node. The beam search algorithm of width one is used in the preferred embodiment of the present invention because it keeps the number of nodes searched to a manageable quantity in a potentially sizeable search tree.

Figure 3:
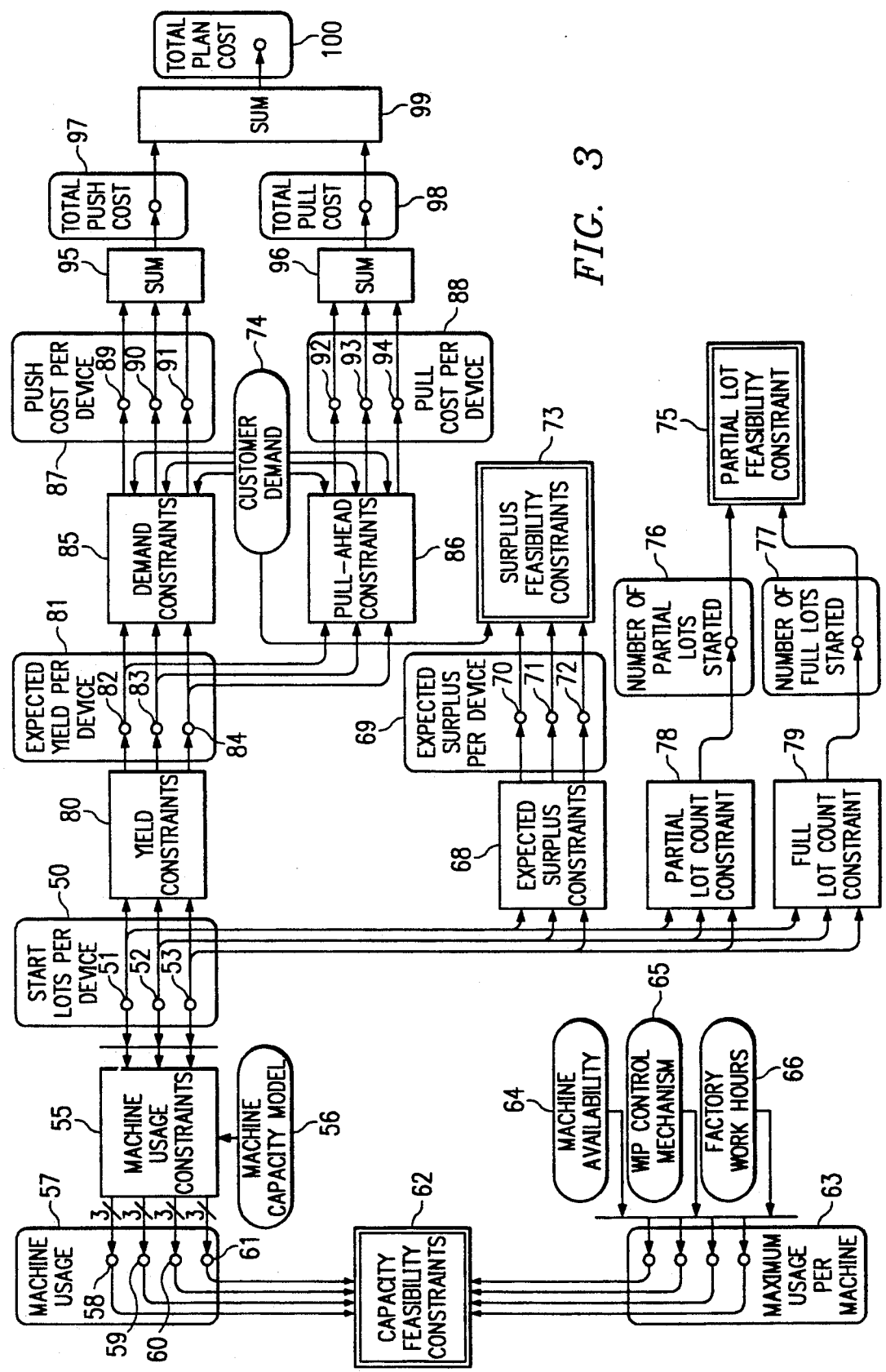
FIG. 3 is a constraint flow diagram illustrating a planning model in the preferred embodiment of the present invention.

With reference to FIG. 3, the details of those factors which contribute to the computation of plan cost, and facility and operational constraints are shown. For ease of illustration, a fictional semiconductor wafer fabrication facility which makes only three types of devices and has only four machines will be used as an example. Referring back to block 34 in FIG. 2, a set of operators is generated which proposes to modify a current plan in some fashion. The modifications proposed typically present a new mix of product types and/or quantities. Therefore, a production plan 50 may constitute variables 51–53, which represent the number of lots to be started for each type of device.

In block 36 of the search algorithm shown in FIG. 2, the generated operators must be examined to determine whether they violate constraints imposed on variables 51–53. One is the constraint which stems from facility capacity.

Each of variables 51–53, which represent the number of lots to be started for each device, is operated upon by machine usage constraints 55, which are derived from a capacity model 56 of each machine in the facility. Such machine capacity modeling is known in the art. The result is the amount of usage by each device type on each piece of machinery 57. Note that since there are four machines, there are four such variables 58–61. The amount of usage per machine, per device, contributes partially to capacity feasibility constraints 62. Therefore,

PLAN_USAGE(MACHINE)=ΣLOT_USAGE(MACHINE,PRODUCT) * STARTS(PRODUCT)

computes for the amount of usage required on each machine for the plan, where LOT_USAGE(MA- CHINE,PRODUCT) represents the amount of usage required by each lot of each device on each machine, and STARTS(PRODUCT) represents the number of lots to be started for each product.

The maximum usage possible for each machine 63, which is computed from a combination of factors such as machine availability due to down time and setup time 64, work-in-process 65, and the number of hours of operation 66 is used to compute the following:

PLAN_USAGE(MACHINE)≦MAX_FAC-
       TORY_UTILIZATION *
       MAX_USAGE(MACHINE), where MAX_FACTORY_UTILIZATION specifies the goal factory utilization, and MAX_USAGE(MA- CHINE) is the maximum usage per machine 63. Therefore, a plan is feasible with respect to (MAX_FAC- TORY_UTILIZATION * MAX_USAGE(MA- CHINE)) if STARTS(PRODUCT) values are such that, for every machine, PLAN_USAGE(MA- CHINE) utilizes the machines no greater than the goal. The capacity constraints 62 further assure that if a machine becomes a bottleneck in the production process, it is used no more than the factory utilization goal. Typically, the factory utilization goal is set by facility personnel.

The number of lots per device type is further regulated by expected surplus constraints 68, which compute the expected surplus per device 69 for the three device types 70-72. This relationship may be expressed in the following fashion:

EXPECTED_SURPLUS(PRODUCT) =
       MAX(0,AVG_OUTPUT(STARTS(PRODUCT)) −
       TOTAL_DEMAND(PRODUCT), and If STARTS(PRODUCT) > 0 then
       EXPECTED_SURPLUS(PRODUCT)/
       TOTAL_DEMAND(PRODUCT)
       ≦ MAX_SURPLUS_DEMAND_RATIO.

EXPECTED_SURPLUS(PRODUCT) is the expected surplus for each product; AVG_OUTPUT(- STARTS(PRODUCT)) equals to STARTS(- PRODUCT) * AVG_YIELD(PRODUCT); TOTAL_DEMAND(PRODUCT) is the amount of all known demands for each product, including non-startable demands; and MAX_SURPLUS_DEMAN- D_RATIO is an input parameter predetermined by facility personnel.

From the foregoing, it may be seen that surplus feasibility constraint 73 states that if the lot-start number is positive for a product, surplus is acceptable if the ratio of expected surplus to total demand (computed from customer demand 74) does not exceed MAX_SUR- PLUS_DEMAND_RATIO.

A facility may choose to accommodate partial lots which contain a fewer number of wafers than a full lot. Partial lots are useful to meet small customer demands, but tend to utilize certain machines poorly, such as batch machines like ovens. Therefore, in order to ensure good facility utilization, a partial lot feasibility constraint 75 is applied to the number of starting lots 50. From the number of starting lots for each product 51-53, the number of partial lots 76 and full lots 77 are computed by partial lot count and full lot count constraints 78 and 79, respectively. Partial lot feasibility constraint 75 may be expressed by the following:

If NUM_FULL_LOTS > 0 then
       NUM_PART_LOTS/NUM_FULL_LOTS ≦
       MAX_PART_LOT_RATIO, where MAX_PART_LOT_RATIO is an input parameter determined by facility personnel.

Returning to block 36 in FIG. 2, it may be seen that the above-described capacity, surplus feasibility, and partial lot feasibility constraints are applied to the plan modification proposed by each operator, and those operators which contradict the constraints are removed from the search. It is important to note that although specific constraints are shown herein, they merely serve as examples of how constraints may be used in the present invention to compute a production plan. Therefore, other constraints known in the art may be applicable to the present invention and are within the scope thereof.

In block 42, those remaining operators are applied to the current plan to compute the cost of the modified plan. This computation is shown in FIG. 3. The number of lots to be started for each product type 51-53 are subject to a yield constraint to compute an expected yield 81 for each device type 82-84. In the preferred embodiment of the present invention, yield constraint 80 may be expressed by the following statistical formula:

YIELD(PRODUCT) =
       AVG_YIELD(PRODUCT) * START(PRODUCT) −
       VARIANCE(PRODUCT) * SQRT(START(PRODUCT)) * K

The average yield and variance of each product, AV- G_YIELD(PRODUCT) and VARIANCE(- PRODUCT), are computed from previous yield values. If desired, trend analysis and other methods to achieve better yield prediction may also be used. K is an input parameter specifying a measure of confidence in the chance that at least YIELD will be produced from START for each product type. From the foregoing, it may be recognized that higher K or confidence results in production of sufficient quantity to more frequently meet customer demand. However, more inventory may be produced, since more lots are started per demand.

Expected yield for each device type 82-84 is subject to demand constraints 85 and pull-ahead constraints 86 to compute push cost and pull cost per device 87 and 88, respectively. Push cost 87 is defined as the cost of not covering customer demand and pull cost 88 is defined as the cost of producing orders ahead of time. Therefore, demand constraints 85 and pull-ahead constraints receive input from customer demand 74. There are known formulas for computing the push and pull costs, and will not be discussed further herein.

The push cost per device 89-91 and pull cost per device 92-94 are summed independently by summation constraints 95 and 96 to calculate for the total push cost 97 and total pull cost 98 of the plan. The total push and pull costs 97 and 98 are summed again by a third summation constraint 99 to yield the total cost 100 of the plan.

As mentioned above, the total plan cost 100 provides a measure of the goodness of the plan. If an operator proposes a plan that costs the least and adds the least amount of work among all remaining operators and yields no feasible children operators in the search tree, then the plan proposed by the operator is the solution plan.

Although the present invention has been described in the environment of a semiconductor wafer fabrication facility, the constraint-based model combined with the heuristic search algorithm as taught by the present invention is applicable to other production environments. No particular form of hardware is required for system operation. The preferred embodiment was designed with a general computer in mind, but would work equally well with any other computerized apparatus.

Furthermore, it should be understood that various changes, substitutions and alterations can be made hereto without departing from the spirit and scope of the present invention as defined by the appended claims.

What is claimed is:

1. Apparatus for production planning in a manufacturing facility, comprising:
    means for generating a plurality of theoretical plans;
    a constraint-based model for receiving one of said theoretical production plans, and applying at least one constraint thereto;
    means for computing a cost function per addition to work in response to said theoretical production plan; and
    heuristic means for searching for a feasible production plan among said plurality of theoretical plans, said feasible plan within said applied constraint and having the least computed cost function value per addition to work.

2. The apparatus, as set forth in claim 1, wherein said constraint-based model applies a plurality of constraints to each of said theoretical production plan, and said feasible plan is within said plurality of constraints.

3. The apparatus, as set forth in claim 1, wherein said constraint-based model comprises means for applying a production capacity constraint of said manufacturing facility to said theoretical plan, said manufacturing facility having at least one machine and wherein said capacity constraint applying means further includes:
    means for storing and providing an availability of each machine;
    means for controlling an amount of work-in-process;
    means for storing and providing a number of work hours of said manufacturing facility; and
    means for receiving said machine availability, work-in-process and work hours and computing the maximum amount of usage of said machine.

4. The apparatus, as set forth in claim 3, wherein said capacity constraint applying means includes:
    means for storing and providing an amount of usage per machine; and
    means for receiving said machine usage and computing an amount of current usage per machine in response thereto.

5. The apparatus, as set forth in claim 4, said capacity constraint applying means further comprises means for formulating said production capacity of said manufacturing facility in response to said maximum usage per machine and said current usage per machine.

6. The apparatus, as set forth in claim 1, wherein said constraint-based model comprises means for applying a constraint describing the amount of surplus that is feasibly produced by said manufacturing facility.

7. The apparatus, as set forth in claim 6, said manufacturing facility producing at least one type of product, and wherein said surplus feasibility constraint applying means further comprises:
    means for computing expected surplus per product type in response to said theoretical production plan; and
    means for formulating said surplus feasibility constraint in response to said computed expected surplus.

8. The apparatus, as set forth in claim 1, wherein said manufacturing facility manufactures in units of a fixed number and also in partial units of a number less than said fixed number, wherein said constraint-based model comprises means for applying a constraint describing the number of partial production units that may be feasibly initiated by said manufacturing facility.

9. The apparatus, as set forth in claim 8, wherein said partial unit feasibility constraint applying means comprises:
    means for computing the number of units that are required in response to said theoretical production plan;
    means for computing the number of partial units that are required in response to said theoretical production plan; and
    means for formulating said partial unit feasibility constraint in response to said computed number of units and partial units required for said theoretical production plan.

10. The apparatus, as set forth in claim 1, said manufacturing facility producing at least one type of product, and wherein said cost function computing means comprises:
    means for computing an expected yield per product type;
    means for receiving customer demand;
    means for computing a push cost per product type in response to said computed expected yield and said received customer demand;
    means for computing a pull cost per product type in response to said computed expected yield and said received customer demand; and
    means for computing a cost function of said production plan in response to said computed push and pull costs.

11. The apparatus, as set forth in claim 2, wherein said theoretical production plan generating means comprises:
    means for modifying a theoretical plan and generating a plurality of children theoretical plans;
    constructing a tree having said theoretical production plan as a root node and said plurality of children theoretical production plans as leaf nodes.

12. The apparatus, as set forth in claim 11, wherein said heuristic searching means further comprises:
    means for discarding any leaf node containing a children theoretical production plan which contradicts said plurality of applied constraints;
    means for selecting from among remaining leaf nodes a theoretical production plan which incurs the least cost; and
    means for providing a solution production plan all of whose children production plans contradict said applied constraint.

13. Apparatus for production planning in a manufacturing facility, said facility manufactures quantities of at least one type of product to meet customer demand, said apparatus comprising:
    means for determining a production plan including the quantities and types of product;

means for computing the capacity of said factory in order to produce said determined quantities and types of product;

means for computing the maximum factory capacity;

means for comparing said computed production capacity with said maximum factory capacity;

means for computing the cost of producing said determined quantities and types of product per addition to work in response to said computed production capacity being less than or equal to said maximum factory capacity; and means for selecting a production plan that incurs the least cost per addition to work.

14. The apparatus, as set forth in claim 13, further comprising means for receiving the quantities and types of product demanded by customers.

15. The apparatus, as set forth in claim 14, further comprising means for computing a surplus feasibility constraint that describes the quantities and types of product which are expected to yield large surpluses when compared to said customer demand.

16. The apparatus, as set forth in claim 15, wherein said cost computing means computes said production cost in response to said determined quantities and types of product generating smaller surpluses as compared with said surplus feasibility constraint.

17. The apparatus, as set forth in claim 13, wherein said capacity computing means further comprises:
means for modeling the machine capacity in said manufacturing facility; and
means for computing machine usage required for said quantities and types of product using said machine capacity model.

18. The apparatus, as set forth in claim 17, wherein said capacity computing means further comprises:
means for storing and supplying machine availability data;
means for storing and supplying the number of work hours of said manufacturing facility;
means for computing the work-in-process workload; and
means for computing the maximum usage per machine in response to said machine availability data, number of work hours and work-in-process workload.

19. The apparatus, as set forth in claim 13, wherein said cost computing means further comprises means for computing the push cost incurred by not producing enough quantities to meet the customer demand.

20. The apparatus, as set forth in claim 19, wherein said cost computing means further comprises means for computing the pull cost incurred by producing ahead of scheduled delivery time.

21. The apparatus, as set forth in claim 20, wherein said cost computing means further comprises means for summing said push and pull cost to determine a total plan cost.

22. The apparatus, as set forth in claim 13, wherein said manufacturing facility produces units of a predetermined quantity of product and partial units of another predetermined quantity of product and said apparatus further comprising:
means for computing the number of units of each product to be produced;
means for computing the number of partial units of each product to be produced;
means for determining the feasibility of producing said computed number of units and partial units; and
said cost computing means computing said cost in response to producing said computed number of units and partial units being feasible.

23. A computer-implemented method for production planning in a manufacturing facility, comprising the steps of:
generating a plurality of theoretical plans;
receiving one of said theoretical production plans, formulating a plurality of constraints in response to said received theoretical plan and applying said formulated constraint thereto;
computing a cost function divided by the addition to work in response to said theoretical production plan; and
searching for a feasible production plan among said plurality of theoretical plans, said feasible plan within said applied constraint and having the least computed cost function value per addition to work, wherein said searching utilizes a heuristic search method.

24. The method, as set forth in claim 23, wherein said constraint formulating and applying step comprises the step of formulating and applying a production capacity constraint of said manufacturing facility to said theoretical plan, said manufacturing facility having at least one machine and wherein said capacity constraint formulating step further comprises the steps of:
storing and providing an availability of each machine;
controlling a work-in-process work load;
storing and providing a number of work hours of said manufacturing facility; and
receiving said machine availability, work-in-process and work hours and computing the maximum amount of usage of said machine.

25. The method, as set forth in claim 24, wherein said capacity constraint formulating step comprises the steps of:
storing and providing an amount of usage per machine; and
receiving said machine usage and computing an amount of current usage per machine in response thereto.

26. The method, as set forth in claim 25, said capacity constraint formulating step further comprises the step of formulating said production capacity of said manufacturing facility in response to said maximum usage per machine and said current usage per machine.

27. The method, as set forth in claim 23, wherein said constraint formulating and applying step comprises the step of formulating and applying a constraint describing the amount of surplus that is feasibly produced by said manufacturing facility.

28. The method, as set forth in claim 27, said manufacturing facility producing at least one type of product, and wherein said surplus feasibility constraint formulating step further comprises:
computing expected surplus per product type in response to said theoretical production plan; and
formulating said surplus feasibility constraint in response to said computed expected surplus.

29. The method, as set forth in claim 23, wherein said manufacturing facility manufactures in units of a fixed number and also in partial units of a number less than said fixed number, wherein said constraint formulating and applying step comprises the step of formulating and applying a constraint describing the number of partial production units that may be feasibly initiated by said manufacturing facility.

30. The method, as set forth in claim 29, said partial unit feasibility constraint formulating step comprises the steps of:
   computing the number of units that are required in response to said theoretical production plan;
   computing the number of partial units that are required in response to said theoretical production plan; and
   formulating said partial unit feasibility constraint in response to said computed number of units and partial units required for said theoretical production plan.

31. The method, as set forth in claim 23, said manufacturing facility producing at least one type of product, and wherein said cost function computing step comprises the steps of:
   computing an expected yield per product type;
   receiving customer demand;
   computing a push cost per product type in response to said computed expected yield and said received customer demand;
   computing a pull cost per product type in response to said computed expected yield and said received customer demand; and
   computing a cost function of said production plan in response to said computed push and pull costs.

32. The method, as set forth in claim 23, wherein said theoretical production plan generating step comprises the steps of:
   modifying a theoretical production plan and generating a plurality of children theoretical production plans;
   constructing a tree having said theoretical production plan as a root node and said plurality of children theoretical production plans as leaf nodes.

33. The method, as set forth in claim 23, wherein said searching step further comprises the steps of:
   discarding any leaf node containing a children theoretical production plan which contradicts said plurality of applied constraints;
   selecting from among remaining leaf nodes a theoretical production plan which has the least computed cost function value; and
   modifying said selected production plan to generate another plurality of children theoretical production plans;
   repeating said above steps until all children production plans from a selected production plan contradict said plurality of constraints; and
   providing said last selected production plan as a solution production plan.

34. A computer-implemented method for generating a production plan for a manufacturing facility, comprising the steps of:
   initializing said production plan;
   generating a plurality of proposals to modify said production plan;
   formulating at least one constraint;
   applying said constraints to said production plan as modified by each of said plurality of proposals;
   discarding any proposal which causes said production plan to contradict said constraints;
   computing the cost of implementing said production plan as modified by each of said remaining proposals;
   selecting a proposal which causes said production plan to have the least computed cost;
   repeating said above steps until no proposals remain after said discarding step; and
   providing the current production plan as a solution production plan.

35. The method, as set forth in claim 34, wherein said constraint formulating and applying steps comprise the steps of formulating and applying a production capacity constraint of said manufacturing facility to said theoretical plan, said manufacturing facility having at least one machine and wherein said capacity constraint formulating step further comprises the steps of:
   storing and providing an availability of each machine;
   controlling a work-in-process work load;
   storing and providing a number of work hours of said manufacturing facility; and
   receiving said machine availability, work-in-process and work hours and computing the maximum amount of usage of said machine.

36. The method, as set forth in claim 35, wherein said capacity constraint formulating step comprises the steps of:
   storing and providing an amount of usage per machine; and
   receiving said machine usage and computing an amount of current usage per machine in response thereto.

37. The method, as set forth in claim 36, said capacity constraint formulating step further comprises the step of formulating said production capacity of said manufacturing facility in response to said maximum usage per machine and said current usage per machine.

38. The method, as set forth in claim 34, wherein said constraint formulating and applying steps comprise the steps of formulating and applying a constraint describing the amount of surplus that is feasibly produced by said manufacturing facility.

39. The method, as set forth in claim 38, said manufacturing facility producing at least one type of product, and wherein said surplus feasibility constraint formulating step further comprises:
   computing expected surplus per product type in response to said theoretical production plan; and
   formulating said surplus feasibility constraint in response to said computed expected surplus.

40. The method, as set forth in claim 34 said manufacturing facility manufactures in units of a fixed number and also in partial units of a number less than said fixed number, wherein said constraint formulating and applying steps comprise the steps of formulating and applying a constraint describing the number of partial production units that may be feasibly initiated by said manufacturing facility.

41. The method, as set forth in claim 40, said partial unit feasibility constraint formulating step comprises the steps of:
   computing the number of units that are required in response to said theoretical production plan;
   computing the number of partial units that are required in response to said theoretical production plan; and
   formulating said partial unit feasibility constraint in response to said computed number of units and partial units required for said theoretical production plan.

42. The method, as set forth in claim 34, said manufacturing facility producing at least one type of product, and wherein said cost function computing step comprises the steps of:

computing an expected yield per product type;

receiving customer demand;

computing a push cost per product type in response to said computed expected yield and said received customer demand;

computing a pull cost per product type in response to said computed expected yield and said received customer demand; and computing a cost function of said production plan in response to said computed push and pull costs.

* * * * *